United States Patent [19]

Drawert et al.

[11] Patent Number: 4,698,396

[45] Date of Patent: Oct. 6, 1987

[54] HARDENABLE SYNTHETIC RESIN MIXTURES

[75] Inventors: Manfred Drawert, Froendenberg; Horst Krase, Hamm; Hans D. Skoda, Kamen, all of Fed. Rep. of Germany

[73] Assignee: Schering Aktiengesellschaft, Berlin and Bergkamen, Fed. Rep. of Germany

[21] Appl. No.: 856,345

[22] Filed: Apr. 28, 1986

[30] Foreign Application Priority Data

May 11, 1985 [DE] Fed. Rep. of Germany ....... 3517013

[51] Int. Cl.$^4$ .................. C08L 63/00; C08L 77/08
[52] U.S. Cl. .................. 525/420.5; 525/423; 524/379
[58] Field of Search ............... 525/423, 420.5; 524/379

[56] References Cited

U.S. PATENT DOCUMENTS

| 583,864 | 9/1959 | Ernst | 525/423 |
|---|---|---|---|
| 4,206,097 | 6/1980 | Drawert et al. | 260/18 EP |
| 4,593,056 | 6/1986 | Qureshi et al. | 525/423 |

FOREIGN PATENT DOCUMENTS

| 4850 | 10/1979 | European Pat. Off. . |
|---|---|---|
| 47364 | 3/1982 | European Pat. Off. . |
| 1494525 | 1/1970 | Fed. Rep. of Germany . |
| 988484 | 4/1965 | United Kingdom . |
| 1071427 | 6/1967 | United Kingdom . |

Primary Examiner—John C. Bleutge
Assistant Examiner—A. Carrillo
Attorney, Agent, or Firm—Curtis, Morris & Safford

[57] ABSTRACT

Coating or printing compositions comprising a non-aromatic organic solvent and, as a binder, a hardenable mixture of synthetic resins, as well as methods for coating or printing using such compositions and coated or printed articles made by such methods.

10 Claims, No Drawings

HARDENABLE SYNTHETIC RESIN MIXTURES

The present invention relates to coating or printing compositions comprising a non-aromatic organic solvent or solvent mixture and, as a binder, a hardenable mixture of synthetic resins, to methods for coating or printing therewith, and to coated and printed articles.

The need for packaging materials has rapidly expanded over the last few years, especially in the consumer goods and food processing industries, and has created a need for modified packaging techniques. These in turn have been imposing steadily more stringent practical requirements on the printing inks and overprint coatings employed in such packaging. The thermoplastic binders used up to now do not fully meet the requirements for high heat resistance made necessary by heat sealing times that keep getting shorter and for resistance to water, acids, bases, and particularly fats and oils which is required under stricter food laws.

By the use of two-component inks based on epoxy resin/curing agent systems, the chemical resistance of the coatings has been improved, but the heat sealing resistance still is not high enough for practical purposes. Systems of this type are described in published German patent application DAS No. 1,494,525. Moreover, to give clear solutions the solvent has had to contain a relatively large proportion of aromatic hydrocarbons.

However, because of the increasing attention which the protection of the workplace and of the environment has been receiving in recent years, binders for overprint varnishes and printing inks are now required which are readily soluble in solvents that are free of aromatic hydrocarbons. The use of aromatics is undesirable also for technological reasons, since it may result in swelling of the rubber and polymer plates used in flexographic printing.

Published German patent applications DAS No. 2,733,597 and DOS No. 2,811,700 describe epoxy resin/curing agent mixtures which give clear solutions when dissolved in solvents free of aromatics and which largely meet practical requirements with regard to film properties and chemical resistance. However, they leave room for improvement so far as printing speed and heat sealing resistance of the printed films are concerned.

U.S. Pat. No. 2,865,870 describes coating compositions comprising epoxy resin/curing agent mixtures and cellulose acetate butyrate. In this system, a solution of a solid epoxy resin and of a polyaminoamide having an amine hydrogen equivalent weight of 237 is used: the system does not give clear films and has to be heat cured.

An object of the present invention is to provide curable binder systems which are readily soluble in non-aromatic organic solvents and which, after evaporation of the solvent, give physically dry and clear films, which films after curing at room temperature or slightly higher temperature, have chemical resistance and high heat sealing resistance up to 250° C. so that they can be processed on modern high speed packaging machines.

In accordance with the present invention, this object is accomplished by using coating and printing compositions comprising a solvent and, as a binder, curable mixtures of synthetic resins, which compositions, after evaporation of their solvent, give physically dry and clear films which cure at room temperature or slightly higher temperature, as binders for printing inks and overprint varnishes. Said synthetic resin blends are composed of (A) glycidyl compounds having more than one epoxy group per molecule and epoxy values from 0.4 to 0.7;
(B) at least one solid synthetic resin component having free amino groups, which is an adduct of
  (1) an excess of a polyaminoamide formed between
    (a) a dimeric fatty acid,
    (b) ethylenediamine, and
    (c) at least one aliphatic, cycloaliphatic, or heterocyclic, diamine,
    wherein the ratio of (B)(1)(b) to (B)(1)(c) may range from 0.95:0.05 to 0.5:0.5, and
  (2) a glycidyl compound having more than one epoxy group per molecule and epoxy values from 0.4 to 0.7, wherein from 0.05 to to 0.30 equivalent of amino hydrogen of polyaminoamide (B)(1) are preadducted by glycidyl compound (B)(2); and
(C) a solid polyamide formed between
  (1) a dimeric fatty acid,
  (2) ethylenediamine, and optionally
  (3) at least one aliphatic, cycloaliphatic, or heerocyclic diamine,
    wherein the ratio of (C)(2) to (C)(3) may range from 1.0:0 to 0.5:0.5 equivalent, and
  (4) at least one short chain, linear aliphatic monocarboxylic acid in an amount from 0.4 to 0.8 equivalent, and more particularly from 0.5 to 0.7 equivalent, based on the total acid equivalents, substantially equivalent amounts of the acid compounds (C)(1) and (C)(4) and amino compounds (C)(2) and (C)(3) being used,
  in which mixture components (A) and (B) are present in substantially equivalent amounts and wherein the ratio (A)+(B):(C) is from 9:1 to 1.5:1;
(D) a non-aromatic organic solvent or solvent mixture, and, optionally,
(E) one or more pigments, dyes, accelerators, and wetting and flow control agents.

A further object of the invention is a method for coating or printing on surfaces using inks and varnishes comprising synthetic resin mixture according to the invention are used as binders and articles so coated or printed.

The epoxy resins according to the invention, which resins may be used either alone or in admixture, are liquid to semisolid aromatic glycidyl ethers having more than one epoxy group per molecule and which are derived from polyhydric phenols, and particularly from bisphenols, or are liquid aliphatic or cycloaliphatic glycidyl ethers which are derived from polyhydric aliphatic hydrocarbons, suitably alkanols, such as ethanediol, propanediol, butanediol, pentanediol, hexanediol, dipropylene glycol, tripropylene glycol, tetrapropylene glycol, nonapropylene glycol, tetraethylene glycol, neopentyl glycol, glycerol, diglycerol, pentaerythritol, or 1,4-dimethylolcyclohexane. Such epoxy resins have epoxy values between 0.40 and 0.7, and more particularly between 0.40 and 0.56 in the case of aromatic glycidyl ethers based on bisphenol A and/or bisphenol F and between 0.6 and 0.7 in the case of aliphatic glucidyl ethers based on neopentyl glycol, hexanediol, glycerine, and diglycerol.

The term "epoxy value" is employed here as usually defined in this field and indicates the number of epoxy groups per 100 g of epoxy resin.

The solid curing agents according to (B), which are used according to the invention, are adducts of an excess of a polyamide with a glycidyl compound.

The polyaminoamides are condensation products of a dimeric fatty acid, ethylenediamine, and at least one aliphatic, cycloaliphatic, or heterocyclic codiamine. The aliphatic amines may have from 3 to 20 carbon atoms, may be linear or branched, saturated or unsaturated, and may contain one or more hetero atoms, particularly oxygen atoms, within the carbon chain. Although amines of hydrocarbons or of hydrocarbons modified by the presence of hetero atoms within the carbon chain are preferred, the amines may also be substituted by functional groups which do not interfere with the formation of a polyamide product when reacted with the glycidyl compound (A) either in preadduct formation or in the overall hardening reaction. In the same way, the cycloaliphatic amines, which usually comprise one or more 5- and/or 6-membered alicycles, may be saturated or unsaturated and have non-interfering substituents in addition to amino substituents, particularly alkyl substituents. The amino groups, further, may be joined to the ring by aminoalkylene groups, for instance. Finally, the heterocyclic amines again usually comprise one or more 5- or 6-membered rings suitably having one or two hetero atoms, usually nitrogen. The amino groups of such heterocyclic amines may be secondary amino groups having their nitrogen atom in the heterocycle (imino groups) or may be present as substituents on the heterocyclic ring. Once again, the compounds may be further substituted with one or more additional functional groups not interfering with polyamide forming reactions.

Examples of amines of this type which give particularly good results when used according to the invention include: 1,2-diaminopropane; 1,4-diaminobutane; 1,2-diaminohexane; 1,9-diaminononane; 1,12-diaminododecane; 2-methyl-1,5-diaminopentane; 2,2-dimethyl-1,3-diaminopropane; 2,2,4- or 4,4,2-trimethyl-1,6-diaminohexane and mixtures of these isomers; 1,10-diamino-4,7-dioxadecane; 1,12-diamino-4,9-dioxadodecane; and 1,14-diamino-4,11-dioxatetradecane; 1,13-diamino-4,7,10-trioxatridecane; 1,2-diaminocyclohexane; 1-amino-3,5,5-trimethyl-3-aminomethyl-cyclohexane; 3,3'-dimethyl-4,4'-diamino-dicyclohexylmethane; 1-amino-4(gamma-aminopropyl)-cyclohexane; 1-methyl-4-[(1-amino-1-methyl)-ethyl]-cyclohexylamine; 3(4),8(9)-bis(aminomethyl)tricyclo[5.2.1.0$^{2,6}$]decane (commonly available as an isomeric mixture); piperazine; N-aminoethylpiperazine; 1,3-piperidylpropane; 1,3-dipiperazinylpropane; 1,2-dipiperazinylethane; and diperazinylmethane.

The ratio of ethylenediamine to codiamine may be varied over a range from 0.95:0.05 to 0.5:0.5, and preferably from 0.9:0.1 to 0.8:0.2, with the total amount of amines being in such excess that the resulting solid polyaminoamide has an amine number ranging from about 30 to 60, and more particularly from 45 to 55.

The term "amine number" is employed here as usually defined in this field. It indicates the amount in milligrams of KOH equivalent to the base content of 1 gram of polyaminoamide as determined by titration with HCl.

The term "dimeric fatty acid" refers to the technical polymerized fatty acids which are on the market. It generally designates polymerized acids obtained from fatty acids. The term "fatty acid" covers unsaturated natural and synthetic monobasic aliphatic acids having from 12 to 22 carbon atoms, and preferably 18 carbon atoms. These fatty acids can be polymerized by generally known methods. (See, for example, U.S. Pat. Nos. 2,482,761 and 3,256,304).

Typical commercially available polymeric fatty acids have approximately the following composition:
Monomeric acids: 5 to 15 weight percent
Dimeric acids: 60 to 80 weight percent
Trimeric and higher polymerized acids: 10 to 35 weight percent Fatty acids may also be used whose dimeric acid content has been increased to 100 weight percent by generally known distilling methods or which have been hydrogenated by known processes.

For adduct formation of the polyaminoamides, one or more of the glycidyl compounds according to (A) may be used. It is also possible to use only other epoxies, or to use such other epoxies in a mixture with the glycidyl compounds of (A) provided that the solubility of the adducts in non-aromatic solvents is not reduced.

Glycidyl ethers derived from bisphenol A and/or bisphenol F and having epoxy values between 0.40 and 0.56 are preferred according to the invention.

The lower limit of adduct formation is dependent on the polyaminoamide and glycidyl compound used. It can be determined quickly and easily by trial and error by checking the hot sealing resistance of the end product. The upper limit is determined analogously. In this case, it must be below the gelation range. In accordance with the invention, a degree of adduct formation ranging from 0.05 to 0.30, and more particularly from 0.15 to 0.25 in the case of aromatic glycidyl ethers and from 0.20 to 0.25 in the case of aliphatic glycidyl ethers, is preferred.

The degree of adduct formation is the fraction of that amount of epoxy resin, designated 1.0, which is required for complete reaction of all reactive amine hydrogen atoms of the polyaminoamide.

The solid polyamide according to (C) is a condensation product of a dimeric fatty acid, ethylenediamine, and a short chain monocarboxylic acid, preferably a ($C_1$–$C_4$)-alkanoic acid. The polyamide may optionally contain a further codiamine component of the kind earlier described with respect to component (B)(1)(c).

The ratio of the components (A)+(B):(C), which ratio is one of the factors determining the level of the hot sealing resistance, is influenced by the nature of both the epoxy resin and the curing agent components and also by the makeup of component (C). in accordance with the invention, a ratio of (A)+(B):(C) ranging from 9:1 to 1.5:1, and more particularly from 4:1 to 1.5:1, is preferred.

Component (C) may be admixed, as a separate component, with a mixture of (A) and (B) or may be mixed in whole or in part as needed with either component (A) or component (B) or with both of these components prior to their combination.

The solvents which are used for component (A) are free of aromatics. While short chain alcohols such as ethanol, n-propanol or isopropanol, or mixtures thereof, are used for the aliphatic glycidyl compounds, mixtures of these alcohols with ethyl acetate are preferred for the aromatic glycidyl ethers.

For the curing agent component (B), isopropanol or n-propanol, or mixtures of the short chain alcohols such as ethanol/n-propanol or n-propanol/isopropanol, are usually preferred.

Any of these solvents can be used for component (C) if it is separately dissolved.

The pigments, dyes, and wetting and flow control agents which are also used are the well known products commonly employed in printing inks. If these materials are added as suspensions or solutions, the solvents comprising the liquid phase should be the same as, or compatible with, those used to dissolve components (A)–(C).

The method of the invention can be used to print on or to coat both inorganic and organic substrates. These may be the foils commonly used in the printing industry, for example polyamide or polyester foils, or heat sensitive foils of polyethylene and polypropylene, for example co-extrusion foils of polyethylene and polypropylene. They may also be untreated or polymer coated or nitrocellulose coated cellophane foils, vapor-metallized foils, paper, boxboard, or polyvinyl chloride, as well as metal foils such as aluminum foils. If desired, combinations of these materials may also be used.

A better understanding of the present invention and of its many advantages will be had by referring to the following specific examples given by way of illustration.

PREPARATION OF FORMULATIONS

1. Epoxy resin formulations 8.0 g of bisphenol A epoxy resin (Table 3, Example 2) and 14.0 g of polyaminoamide (Example 2, Table 2) were dissolved with stirring and mild heating in a mixture of 18.0 g of ethanol and 10.0 g of ethyl acetate.

After cooling, the solution was ready for use. (Example 1, Table 5).

2. Curing agent formulations 32.4 g of polyaminoamide (Example 1, Table 1) and 13.0 g of polyaminoamide (Example 2, Table 2) were dissolved in a mixture of 29.0 g of ethanol and 23.0 g of n-propanol, with stirring and mild heating. After cooling, 2.6 g of bisphenol A epoxy resin (Table 3, Example 2) were added, directly followed by stirring. The solution, slightly turbid at first, was then heated to about 60° C., stirring being continued for 5 hours at that temperature.

The solution, now clear, was ready for use after cooling. (Example 1, Table 4).

Formulations which are ready for use and have the proper mixing ratio are obtained when the amounts specified in Table 6 are combined and well mixed.

All of the curing agent and resin formulations listed in Tables 4 and 5 as well as the mixtures listed in Table 6 are prepared in the same manner.

PREPARATION OF PRINTING INKS

On completion, the curing agent solutions are pigmented using dispersing apparatus commonly used in the printing ink industry. Organic and inorganic pigments as well as soluble dyes can be used for this purpose in the amount generally used in this field. After the curing agent and epoxy resin components have been mixed in the proper ratio (see Table 6), the printing inks are diluted to the proper printing viscosity, depending on the requirements of the particular printing process.

A selection of printing inks so prepared was printed with a commercial printing press from roll to roll on both polyethylene foil and aluminum foil. The prints were physically dry as soon as the solvent had evaporated and no sticking or setoff of the inks on the back of the rolled-up foil was observed. After being allowed to stand for seven days at room temperature, the prints on aluminum foil were subjected to a test for hot sealing resistance commonly employed in the printing ink industry and described below. The values for this thermal stability property are listed in Table 7.

TEST FOR HOT SEALING RESISTANCE

Strips about 4 cm wide of prints on aluminum foil are folded print against print and sealed to each other in a Brugger automatic heat sealing machine at a pressure of 1 kg/cm$^3$ and a 1-second sealing time at temperatures rising from 80° to 250° C. After cooling, the strips were unfolded

EVALUATION OF TESTING METHOD

| | |
|---|---|
| 0 | Absolutely flawless |
| 1 | Rustling*, no damage to film |
| 2 | Blocking, less than 5 percent of film damaged |
| 3 | Blocking, less than 10 percent of film damaged |
| 4 | Blocking, less than 25 percent of film damaged |
| 5 | Blocking, more than 25 percent of film damaged |

*Rustling: Sound is generated as foils are being separated, because of adhesion of the foils. The cause is unknown, but there is no blocking of film.

As the values ascertained show, when the synthetic resin blends in accordance with the invention were used as printing ink vehicles, markedly higher heat resistances (hot sealing resistances) were obtained than with the two component printing inks comprising epoxy resin which are now known in the art.

TABLE 1

| | (Components according to claim 1, [B]) | | | | | | | | |
|---|---|---|---|---|---|---|---|---|---|
| Example No. | Dimerized fatty acid | | Ethylenediamine | | Co-diamine | | | Amine value | Ring and ball softening point |
| | Grams | Equiv. | Grams | Equiv. × 1.45 | | Grams | Equiv. × 1.45 | | |
| 1 | 400 | 1.0 | 55.14 | 0.9 × 1.45 | IPD[1] | 17.19 | 0.1 × 1.45 | 51 | 102° C. |
| 2 | 400 | 1.0 | 49.02 | 0.8 × 1.45 | IPD | 34.38 | 0.2 × 1.45 | 57 | 74° C. |
| 3 | 400 | 1.0 | 30.64 | 0.5 × 1.45 | TMD[2] | 80.47 | 0.5 × 1.45 | 48 | 63° C. |
| 4 | 400 | 1.0 | 30.64 | 0.5 × 1.45 | HDA[3] | 58.70 | 0.5 × 1.45 | 46 | 67° C. |
| 5 | 400 | 1.0 | 30.64 | 0.5 × 1.45 | 1,2PrDA[4] | 37.71 | 0.5 × 1.45 | 44 | 80° C. |
| 6 | 400 | 1.0 | 49.02 | 0.8 × 1.45 | BDA[5] | 40.10 | 0.2 × 1.45 | 52 | 78° C. |
| 7* | 400 | 1.0 | 43.35 | 0.9 × 1.14 | IPD | 13.61 | 0.1 × 1.14 | 21 | 105° C. |

LEGENDS:
[1]IPD = 1-amino-3,5,5-trimethyl-3-aminomethyl cyclohexane
[2]THD = Mixture of 2,2,4-trimethyl-1,6-diaminohexane and 4,4,2-trimethyl-1,6-diaminohexane
[3]HDA = 1,6-diaminohexane
[4]1,2PrDA = 1,2-diaminopropane
[5]BDA = 1,12-diamino-4,9-dioxadodecane
*Comparative example

TABLE 2

| | | | | | (according to components [C]) | | | | | | | | |
|---|---|---|---|---|---|---|---|---|---|---|---|---|---|
| | Dimeric fatty acid | | Co-carboxylic | | Ethylene-diamine | | Co di- | | | Amine | Acid | Pa/s | R + B |
| No. | Grams | Equiv. | acid | Grams | Equiv. | Grams | Eq. | amine | Grams | Eq. | value | value | 160° C. | °C. |
| 1 | 400 | 0.5 | Formic acid | 78.80 | 0.5 | 84.50 | 1.0 | — | — | — | 6.5 | 2.8 | 0.17 | 77 |
| 2 | 320 | 0.5 | Acetic acid | 67.43 | 0.5 | 67.60 | 1.0 | — | — | — | 4.1 | 3.8 | 0.10 | 145 |
| 3 | 350 | 0.4 | " | 111.00 | 0.6 | 92.40 | 1.0 | — | — | — | 4.7 | 5.4 | 0.14 | 146 |
| 4 | 250 | 0.3 | " | 122.90 | 0.7 | 88.00 | 1.0 | — | — | — | 2.4 | 5.1 | 0.10 | 148 |
| 5 | 300 | 0.5 | Propionic a. | 77.96 | 0.5 | 31.68 | 0.5 | HDA | 61.24 | 0.5 | 3.5 | 1.3 | 0.25 | 120 |
| 6 | 300 | 0.5 | " | 77.96 | 0.5 | 31.68 | 0.5 | TCD[6] | 102.04 | 0.5 | 2.1 | 0.7 | 0.25 | 120 |
| 7 | 300 | 0.5 | " | 77.96 | 0.5 | 31.68 | 0.5 | BDA[7] | 103.65 | 0.5 | 0.7 | 1.3 | 0.10 | 116 |
| 8 | 300 | 0.5 | — " | 77.96 | 0.5 | 31.68 | 0.5 | TMD | 83.22 | 0.5 | 3.0 | 1.4 | 0.12 | 120 |
| 9 | 300 | 0.5 | " | 77.96 | 0.5 | 31.68 | 0.5 | Pip[8] | 45.27 | 0.5 | 3.7 | 1.2 | 0.10 | 120 |
| 10 | 300 | 0.5 | Butyric acid | 92.80 | 0.5 | 31.68 | 0.5 | IPD | 88.87 | 0.5 | 4.3 | 0.7 | 0.20 | 108 |
| 11 | 300 | 0.5 | " | 92.80 | 0.5 | 31.68 | 0.5 | HDA | 61.24 | 0.5 | 3.4 | 1.0 | 0.10 | 107 |
| 12 | 300 | 0.5 | " | 92.80 | 0.5 | 31.68 | 0.5 | TCD | 102.04 | 0.5 | 2.3 | 0.9 | 0.20 | 120 |
| 13 | 300 | 0.5 | " | 92.80 | 0.5 | 31.68 | 0.5 | BDA | 103.65 | 0.5 | 2.2 | 1.0 | 0.10 | 125 |
| 14 | 300 | 0.5 | " | 92.80 | 0.5 | 31.68 | 0.5 | TMD | 83.22 | 0.5 | 4.8 | 0.7 | 0.10 | 130 |
| 15 | 300 | 0.5 | " | 92.80 | 0.5 | 31.68 | 0.5 | Pip | 45.27 | 0.5 | 3.0 | 1.1 | 0.10 | 126 |
| 16 | 300 | 0.5 | " | 92.80 | 0.5 | 31.68 | 0.5 | 1,2PrDA | 39.00 | 0.5 | 4.2 | 4.4 | 0.10 | 130 |
| 17 | 300 | 0.5 | Propionic a. | 77.96 | 0.5 | 31.68 | 0.5 | " | 39.00 | 0.5 | 5.2 | 4.8 | 0.15 | 128 |
| 18 | 300 | 0.5 | " | 77.96 | 0.5 | 50.70 | 0.8 | HDA | 24.50 | 0.2 | 2.9 | 1.7 | 0.14 | 150 |
| 19 | 300 | 0.5 | " | 77.96 | 0.5 | 50.70 | 0.8 | IPD | 35.55 | 0.2 | 3.3 | 2.5 | 0.14 | 149 |
| 20 | 300 | 0.5 | " | 77.96 | 0.5 | 50.70 | 0.8 | TCD | 40.82 | 0.2 | 3.3 | 2.7 | 0.15 | 149 |
| 21 | 300 | 0.5 | " | 77.96 | 0.5 | 50.70 | 0.8 | BDA | 41.50 | 0.2 | 2.1 | 1.5 | 0.13 | 150 |
| 22 | 300 | 0.5 | " | 77.96 | 0.5 | 50.70 | 0.8 | TMD | 33.30 | 0.2 | 3.5 | 2.6 | 0.14 | 150 |
| 23 | 300 | 0.5 | " | 77.96 | 0.5 | 50.70 | 0.8 | 1,2PrDA | 15.60 | 0.2 | 4.7 | 2.7 | 0.14 | 152 |
| 24 | 300 | 0.5 | " | 77.96 | 0.5 | 50.70 | 0.8 | Pip | 18.11 | 0.2 | 2.6 | 1.5 | 0.15 | 150 |
| 25 | 250 | 0.6 | " | 43.20 | 0.4 | 22.00 | 0.5 | 1,2PrDA | 27.00 | 0.5 | 4.9 | 7.2 | 0.19 | 125 |
| 26 | 250 | 0.4 | " | 97.50 | 0.6 | 33.00 | 0.5 | " | 40.60 | 0.5 | 8.6 | 7.7 | 0.11 | 132 |
| 27 | 250 | 0.3 | " | 151.60 | 0.7 | 44.00 | 0.5 | " | 54.20 | 0.5 | 9.5 | 8.1 | 0.10 | 132 |
| 28* | 400 | 0.725 | Acetic acid | 31.97 | 0.275 | 34.97 | 0.6 | " | 28.70 | 0.4 | 4.3 | 5.1 | 0.52 | 127 |

[6]TCD = 3(4),8(9)-bis(aminomethyl)tricyclo-[ 5.2.1.0$^{2,6}$]-decane (tech. isomer mixture)
[7]BDA = 1,2-diamino-4,9-dioxadodecane
[8]Pip = piperazine
*Comparative example

TABLE 3

(Components according to [A])

| No. | Glycidyl compounds based on | Epoxy value |
|---|---|---|
| 1 | Bisphenol A | 0.42 |
| 2 | Bisphenol A | 0.54 |
| 3 | Bisphenol F | 0.54 |
| 4 | Glycerol | 0.63 |
| 5 | Hexanediol | 0.61 |
| 6 | Diglycerol | 0.66 |
| 7 | Neopentyl glycol | 0.67 |

Bisphenol A = 4,4'-dihydroxydiphenylpropane-(2,2)
Bisphenol F = 4,4'-dihydroxydiphenylmethane

TABLE 4

| | | | | | Curing-agent formulations | | | | | |
|---|---|---|---|---|---|---|---|---|---|---|
| | No. | | No. | | Degree of pre- | No. | | | Solvent, grams | |
| No. | Table 1 | Amount g | Table 3 | Amount g | adduction, equivalents | Table 2 | Amount g | Ethanol | Iso-propanol | n-propanol |
| 1 | 1 | 32.4 | 2 | 2.6 | 0.25 | 2 | 13.0 | 29.0 | — | 23.0 |
| 2 | 2 | 32.4 | 2 | 2.6 | 0.25 | 1 | 13.0 | 29.0 | — | 23.0 |
| 3 | 3 | 32.4 | 2 | 2.6 | 0.25 | 2 | 13.0 | 29.0 | — | 23.0 |
| 4 | 4 | 32.4 | 2 | 2.6 | 0.25 | 3 | 13.0 | 29.0 | — | 23.0 |
| 5 | 5 | 32.4 | 2 | 2.6 | 0.25 | 4 | 13.0 | 29.0 | — | 23.0 |
| 6 | 6 | 32.4 | 2 | 2.6 | 0.25 | 2 | 13.0 | 29.0 | — | 23.0 |
| 7 | 1 | 35.4 | 2 | 2.6 | 0.22 | 25 | 10.0 | — | 52.0 | — |
| 8 | 2 | 35.4 | 2 | 2.6 | 0.22 | 26 | 10.0 | — | 52.0 | — |
| 9 | 2 | 35.4 | 2 | 2.6 | 0.22 | 27 | 10.0 | — | 52.0 | — |
| 10 | 1 | 36.5 | 2 | 2.5 | 0.22 | 5 | 9.0 | 35.0 | — | 17.0 |
| 11 | 1 | 36.5 | 2 | 2.5 | 0.22 | 7 | 9.0 | 35.0 | — | 17.0 |
| 12 | 1 | 36.5 | 2 | 2.5 | 0.22 | 9 | 9.0 | 35.0 | — | 17.0 |
| 13 | 2 | 36.5 | 2 | 2.5 | 0.22 | 10 | 9.0 | 35.0 | — | 17.0 |
| 14 | 1 | 36.5 | 2 | 2.5 | 0.22 | 12 | 9.0 | 35.0 | — | 17.0 |
| 15 | 2 | 36.5 | 2 | 2.5 | 0.22 | 14 | 9.0 | 35.0 | — | 17.0 |
| 16 | 4 | 36.5 | 2 | 2.5 | 0.22 | 17 | 9.0 | 35.0 | — | 17.0 |
| 17 | 1 | 32.4 | 2 | 2.6 | 0.25 | 18 | 13.0 | 29.0 | — | 23.0 |
| 18 | 1 | 32.4 | 2 | 2.6 | 0.25 | 21 | 13.0 | 29.0 | — | 23.0 |
| 19 | 1 | 32.4 | 2 | 2.6 | 0.25 | 23 | 13.0 | 29.0 | — | 23.0 |
| 20 | 1 | 35.4 | 1 | 2.6 | 0.18 | 2 | 10.0 | — | 52.0 | — |
| 21 | 1 | 35.4 | 3 | 2.6 | 0.22 | 2 | 10.0 | — | 52.0 | — |
| 22 | 1 | 34.0 | 4 | 2.0 | 0.21 | 2 | 9.0 | — | 55.0 | — |
| 23 | 1 | 34.0 | 5 | 2.0 | 0.21 | 2 | 9.0 | — | 55.0 | — |
| 24 | 1 | 34.5 | 6 | 2.0 | 0.22 | 2 | 9.0 | — | 54.5 | — |
| 25 | 1 | 34.5 | 7 | 2.0 | 0.22 | 2 | 9.0 | — | 54.5 | — |

TABLE 4-continued

| | | | | Curing-agent formulations | | | Solvent, grams | | |
|---|---|---|---|---|---|---|---|---|---|
| | No. Table 1 | Amount g | No. Table 3 | Amount g | Degree of pre-adduction, equivalents | No. Table 2 | Amount g | Ethanol | Iso-propanol | n-propanol |
| 26 | 1 | 35.4 | 2 | 2.6 | 0.22 | 2 | 28.0 | 42.0 | — | 42.0 |
| 27 | 1 | 35.4 | 2 | 2.6 | 0.22 | — | — | 30.0 | — | 32.0 |
| 28 | 1 | 35.4 | 2 | 1.2 | 0.11 | 2 | 10.0 | — | 53.4 | — |
| 29 | 1 | 35.4 | 2 | 3.1 | 0.29 | 2 | 10.0 | — | 51.5 | — |
| 30 | 1 | 35.4 | 2 | 2.6 | 0.22 | 2 | 2.0 | — | 60.0 | — |
| 31 | 1 | 35.4 | 2 | 2.6 | 0.22 | 2 | 2.0 | — | 60.0 | — |
| 32* | 1 | 35.4 | — | — | — | 2 | 10.0 | — | 54.6 | — |
| 33* | 1 | 35.4 | 2 | 2.6 | 0.22 | — | — | — | 62.0 | — |
| 34* | 1 | 35.4 | 2 | 2.6 | 0.22 | 2 | 37.0 | 40.0 | — | 35.0 |
| 35* | 7 | 24.1 | 2 | 0.9 | 0.27 | 2 | 3.0 | 17.0 | — | 15.0 |
| 36* | 1 | 35.4 | 2 | 2.6 | 0.22 | 28 | 10.0 | — | 52.0 | — |

*Nos. 32–36 = comparative examples

TABLE 5

| | Epoxy-resin formulations | | | | | | |
|---|---|---|---|---|---|---|---|
| No. | No. Table 3 | Amount g | No. Table 2 | Amount g | Ethanol | n-Propanol | Ethyl acetate |
| 1 | 2 | 8.0 | 2 | 14.0 | 18.0 | — | 10.0 |
| 2 | 2 | 8.0 | 1 | 14.0 | 18.0 | — | 10.0 |
| 3 | 2 | 8.0 | 2 | 14.0 | 18.0 | — | 10.0 |
| 4 | 2 | 8.0 | 3 | 14.0 | 18.0 | — | 10.0 |
| 5 | 2 | 8.0 | 4 | 14.0 | 18.0 | — | 10.0 |
| 6 | 2 | 8.0 | 2 | 14.0 | 18.0 | — | 10.0 |
| 7 | 2 | 9.0 | 25 | 14.0 | 14.0 | — | 13.0 |
| 8 | 2 | 9.0 | 26 | 14.0 | 14.0 | — | 13.0 |
| 9 | 2 | 9.0 | 27 | 14.0 | 14.0 | — | 13.0 |
| 10 | 2 | 9.0 | 5 | 15.0 | 13.0 | — | 13.0 |
| 11 | 2 | 9.0 | 7 | 15.0 | 13.0 | — | 13.0 |
| 12 | 2 | 9.0 | 9 | 15.0 | 13.0 | — | 13.0 |
| 13 | 2 | 9.0 | 10 | 15.0 | 13.0 | — | 13.0 |
| 14 | 2 | 9.0 | 12 | 15.0 | 13.0 | — | 13.0 |
| 15 | 2 | 9.0 | 14 | 15.0 | 13.0 | — | 13.0 |
| 16 | 2 | 9.0 | 17 | 15.0 | 13.0 | — | 13.0 |
| 17 | 2 | 8.0 | 18 | 14.0 | 18.0 | — | 10.0 |
| 18 | 2 | 8.0 | 21 | 14.0 | — | 18.0 | 10.0 |
| 19 | 2 | 8.0 | 23 | 14.0 | — | 18.0 | 10.0 |
| 20 | 1 | 11.5 | 2 | 13.0 | — | 18.0 | 17.5 |
| 21 | 3 | 9.0 | 2 | 13.0 | 18.0 | — | 10.0 |
| 22 | 4 | 7.5 | 2 | 13.0 | — | 29.5 | — |
| 23 | 5 | 7.5 | 2 | 13.0 | — | 29.5 | — |
| 24 | 6 | 7.0 | 2 | 13.0 | — | 30.0 | — |
| 25 | 7 | 7.0 | 2 | 13.0 | — | 30.0 | — |
| 26 | 2 | 9.0 | — | — | 6.0 | — | 5.0 |
| 27 | 2 | 9.0 | 2 | 28.0 | 33.0 | — | 30.0 |
| 28 | 2 | 10.4 | 2 | 13.0 | — | 16.6 | 10.0 |
| 29 | 2 | 8.5 | 2 | 13.0 | — | 18.5 | 10.0 |
| 30 | 2 | 9.0 | 2 | 10.0 | 16.0 | — | 15.0 |
| 31 | 2 | 9.0 | 2 | 3.5 | 25.0 | — | 12.5 |
| 32* | 2 | 11.6 | 2 | 14.0 | 20.0 | — | 14.4 |
| 33* | 2 | 9.0 | — | — | 21.0 | — | 20.0 |
| 34* | 2 | 9.0 | 2 | 35.5 | 35.5 | — | 20.0 |
| 35* | 2 | 2.5 | 2 | 11.0 | 15.0 | — | 11.5 |
| 36* | 2 | 9.0 | — | 14.0 | 14.0 | — | 13.0 |

*Nos. 32–36 = comparative examples

TABLE 6

Mixing examples

| No. | No. Table 4 | Amount g | No. Table 5 | Amount g | Ratio of components (A) + (B) | (C) |
|---|---|---|---|---|---|---|
| 1 | 1 | 100 | 1 | 50 | 1,6 | 1 |
| 2 | 2 | 100 | 2 | 50 | 1,6 | 1 |
| 3 | 3 | 100 | 3 | 50 | 1,6 | 1 |
| 4 | 4 | 100 | 4 | 50 | 1,6 | 1 |
| 5 | 5 | 100 | 5 | 50 | 1,6 | 1 |
| 6 | 6 | 100 | 6 | 50 | 1,6 | 1 |
| 7 | 7 | 100 | 7 | 50 | 2,0 | 1 |
| 8 | 8 | 100 | 8 | 50 | 2,0 | 1 |
| 9 | 9 | 100 | 9 | 50 | 2,0 | 1 |
| 10 | 10 | 100 | 10 | 50 | 2,0 | 1 |
| 11 | 11 | 100 | 11 | 50 | 2,0 | 1 |
| 12 | 12 | 100 | 12 | 50 | 2,0 | 1 |
| 13 | 13 | 100 | 13 | 50 | 2,0 | 1 |
| 14 | 14 | 100 | 14 | 50 | 2,0 | 1 |
| 15 | 15 | 100 | 15 | 50 | 2,0 | 1 |
| 16 | 16 | 100 | 16 | 50 | 2,0 | 1 |
| 17 | 17 | 100 | 17 | 50 | 1,6 | 1 |
| 18 | 18 | 100 | 18 | 50 | 1,6 | 1 |

TABLE 6-continued

| No. | No. Table 4 | Amount g | No. Table 5 | Amount g | Ratio of components (A) + (B) | (C) |
|---|---|---|---|---|---|---|
| 19 | 19 | 100 | 19 | 50 | 1,6 | 1 |
| 20 | 20 | 100 | 20 | 60 | 2,2 | 1 |
| 21 | 21 | 100 | 21 | 50 | 2,0 | 1 |
| 22 | 22 | 100 | 22 | 50 | 2,0 | 1 |
| 23 | 23 | 100 | 23 | 50 | 2,0 | 1 |
| 24 | 24 | 100 | 24 | 50 | 2,0 | 1 |
| 25 | 25 | 100 | 25 | 50 | 2,0 | 1 |
| 26 | 26 | 100 | 26 | 20 | 1,7 | 1 |
| 27 | 27 | 100 | 27 | 100 | 1,7 | 1 |
| 28 | 28 | 100 | 28 | 50 | 2,0 | 1 |
| 29 | 29 | 100 | 29 | 50 | 2,0 | 1 |
| 30 | 30 | 100 | 30 | 50 | 3,9 | 1 |
| 31 | 31 | 100 | 31 | 50 | 8,6 | 1 |
| 32* | 32 | 100 | 32 | 60 | 2,0 | 1 |
| 33* | 33 | 100 | 33 | 50 | — | — |
| 34* | 34 | 150 | 34 | 100 | 0,7 | 1 |
| 35* | 35 | 60 | 35 | 40 | 2 | 1 |
| 36* | 36 | 100 | 36 | 50 | 2 | 1 |

*Nos. 32–36 = comparative examples

TABLE 7

| Sealing temp. | No. Table 6 | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 60° C. | 0 | 0 | 0 | 0 | 0 | 0 | 0 | 0 | 0 | 0 | 0 | 0 | 0 | 0 | 0 | 0 | 0 | 0 |
| 80° C. | 0 | 0 | 0 | 0 | 0 | 0 | 0 | 0 | 0 | 0 | 0 | 0 | 0 | 0 | 0 | 0 | 0 | 0 |
| 90° C. | 0 | 0 | 0 | 0 | 0 | 0 | 0 | 0 | 0 | 0 | 0 | 0 | 1 | 0 | 0 | 0 | 0 | 0 |
| 100° C. | 0 | 0 | 0 | 0 | 0 | 0 | 1 | 0 | 0 | 1 | 0 | 0 | 0 | 0 | 1 | 1 | 0 | 0 |
| 110° C. | 0 | 0 | 0 | 0 | 0 | 0 | 0 | 0 | 0 | 0 | 0 | 0 | 1 | 0 | 0 | 0 | 0 | 1 |
| 120° C. | 0 | 1 | 0 | 1 | 0 | 0 | 1 | 0 | 0 | 1 | 0 | 0 | 0 | 1 | 1 | 1 | 1 | 0 |
| 130° C. | 0 | 0 | 0 | 0 | 1 | 1 | 0 | 0 | 1 | 0 | 0 | 1 | 0 | 1 | 0 | 1 | 0 | 0 |
| 140° C. | 1 | 1 | 0 | 1 | 1 | 1 | 1 | 0 | 0 | 1 | 1 | 0 | 1 | 0 | 1 | 1 | 0 | 0 |
| 150° C. | 1 | 0 | 0 | 0 | 0 | 0 | 0 | 0 | 0 | 0 | 1 | 0 | 1 | 1 | 0 | 1 | 1 | 1 |
| 160° C. | 0 | 0 | 0 | 1 | 1 | 0 | 0 | 0 | 0 | 0 | 0 | 0 | 1 | 0 | 1 | 0 | 0 | 0 |
| 170° C. | 1 | 0 | 0 | 1 | 0 | 1 | 0 | 0 | 0 | 0 | 0 | 0 | 0 | 0 | 0 | 0 | 0 | 0 |
| 180° C. | 0 | 0 | 0 | 0 | 0 | 1 | 0 | 1 | 0 | 0 | 1 | 0 | 0 | 0 | 0 | 0 | 0 | 0 |
| 190° C. | 0 | 0 | 0 | 1 | 1 | 1 | 0 | 0 | 1 | 0 | 0 | 0 | 0 | 0 | 0 | 1 | 0 | 0 |
| 200° C. | 1 | 0 | 0 | 1 | 0 | 0 | 1 | 0 | 0 | 0 | 0 | 0 | 1 | 0 | 0 | 0 | 0 | 0 |
| 225° C. | 0 | 0 | 0 | 1 | 0 | 0 | 0 | 0 | 0 | 0 | 0 | 0 | 0 | 0 | 0 | 0 | 0 | 1 |
| 250° C. | 0 | 0 | 0 | 1 | 0 | 1 | 1 | 1 | 1 | 0 | 0 | 0 | 1 | 0 | 0 | 1 | 0 | 1 |

| Sealing temp. | 19 | 20 | 21 | 22 | 23 | 24 | 25 | 26 | 27 | 28 | 29 | 30 | 31 | 32* | 33* | 34* | 35* | 36* |
|---|---|---|---|---|---|---|---|---|---|---|---|---|---|---|---|---|---|---|
| 60° C. | 0 | 0 | 0 | 0 | 0 | 0 | 0 | 0 | 0 | 0 | 0 | 0 | 0 | 0 | 0 | 0 | 0 | 0 |
| 80° C. | 0 | 0 | 0 | 0 | 0 | 0 | 0 | 0 | 0 | 0 | 0 | 0 | 0 | 0 | 0 | 0 | 0 | 0 |
| 90° C. | 0 | 0 | 0 | 0 | 0 | 0 | 0 | 0 | 0 | 0 | 0 | 0 | 0 | 0 | 0 | 0 | 0 | 0 |
| 100° C. | 0 | 0 | 0 | 0 | 0 | 0 | 0 | 0 | 0 | 0 | 0 | 0 | 0 | 1 | 0 | 0 | 1 | 1 |
| 110° C. | 0 | 0 | 0 | 0 | 1 | 0 | 1 | 0 | 0 | 0 | 0 | 0 | 1 | 2 | 1 | 1 | 2–3 | 0 |
| 120° C. | 0 | 0 | 1 | 0 | 2 | 1 | 0 | 1 | 0 | 1 | 0 | 1 | 1 | 2 | 2 | 0 | 2–3 | 2 |
| 130° C. | 0 | 1 | 0 | 1 | 1 | 0 | 1 | 0 | 2 | 0 | 1 | 0 | 2 | 2–3 | 3 | 2 | 3–4 | 2–3 |
| 140° C. | 0 | 1 | 1 | 0 | 2 | 1 | 1 | 1 | 1 | 1 | 1 | 1 | 2 | 2–3 | 2–3 | 2–3 | 3–4 | 3–4 |
| 150° C. | 0 | 1 | 1 | 1 | 2 | 0 | 1 | 1 | 1 | 0 | 1 | 0 | 1 | 3 | 3 | 3 | 3–4 | 3–4 |
| 160° C. | 0 | 1 | 0 | 0 | 1 | 0 | 0 | 0 | 0 | 1 | 0 | 1 | 1 | 2 | 3 | 2–3 | 3 | 3 |
| 170° C. | 0 | 1 | 0 | 0 | 0 | 0 | 0 | 0 | 0 | 0 | 0 | 0 | 1 | 2 | 3–4 | 3–4 | 3 | 3 |
| 180° C. | 0 | 0 | 0 | 0 | 1 | 0 | 1 | 0 | 0 | 1 | 0 | 0 | 1 | 2–3 | 3–4 | 3 | 3–4 | 3–4 |
| 190° C. | 0 | 0 | 0 | 0 | 0 | 1 | 0 | 0 | 0 | 1 | 0 | 0 | 1–2 | 3 | 3 | 3 | 2–3 | 3–4 |
| 200° C. | 0 | 0 | 0 | 0 | 0 | 1 | 0 | 0 | 0 | 0 | 1 | 1 | 1–2 | 3 | 3–4 | 4 | 2–3 | 4 |
| 225° C. | 0 | 1 | 0 | 0 | 0 | 0 | 0 | 0 | 0 | 0 | 0 | 1 | 2 | 3–4 | 3–4 | 4 | 3 | 3–4 |
| 250° C. | 0 | 1 | 1 | 0 | 1 | 0 | 0 | 0 | 0 | 1 | 0 | 1 | 2 | 4 | 3–4 | 4–5 | 3–4 | 4 |

*Nos. 32–36 = comparative examples

What is claimed is:

1. A coating or printing composition comprising a non-aromatic solvent or solvent mixture and, as a binder, a hardenable synthetic resin mixture comprising
(A) a glycidyl compound having more than one epoxy group per molecule and an epoxy value from 0.4 to 0.7;
(B) a solid synthetic resin component having free amino groups which is an adduct formed between
   (1) an excess of a polyaminoamide in turn formed between
      (a) a dimeric fatty acid,
      (b) ethylenediamine, and
      (c) a diamine which is a member selected from the group consisting of aliphatic diamines having from 3 to 20 carbon atoms, such aliphatic amines wherein the carbon chain is interrupted by at least one oxygen atom to form an oxa-compound, cycloaliphatic diamines having 5 or 6 ring members, and heterocyclic diamines having 5 or 6 ring members, and
   (2) a glycidyl compound having more than one epoxy group per molecule and an epoxy value from 0.4 to 0.7,
in which resin component (B) the ratio of (B)(1)(b) to (B)(1)(c) may range from 0.95:0.05 to 0.5:0.5 and from 0.05 to 0.30 equivalent of amine hydrogen atoms of polyaminoamide (B)(1) have been preadducted by reaction with glycidyl compound (B)(2); and
(C) a solid polyamide formed between
   (1) a dimeric fatty acid,
   (2) ethylenediamine, and
   (3) a diamine which is a member selected from the group consisting of aliphatic diamines having from 3 to 20 carbon atoms, such aliphatic amines wherein the carbon chain is interrupted by at least one oxygen atom to form an oxa-compound, cycloaliphatic diamines having 5 or 6 ring members, and heterocyclic diamines having 5 or 6 ring members, and
   (4) a short chain, linear aliphatic monocarboxylic acid in an amount from 0.4 to 0.8 equivalent, based on the total acid equivalents,
in which polyamide (C) the equivalent ratio of (C)(1) to (C)(2) is from 1.0:0 to 0.5:0.5 and substantially equivalent amounts of an acid component comprising compounds (C)(1) and (C)(4) and of a basic component comprising amino compounds (C)(2) and (C)(3) are reacted to form said polyamide (C), in which mixture (A) and (B) are present in substantially equivalent amounts and the weight ratio (A)+(B):(C) is from 9:1 to 1.5:1.

2. A composition as in claim 1 wherein said glycidyl compound (A) is a member selected from the group consisting of (1) liquid aromatic glycidyl ethers of bisphenol A and bisphenol F having epoxy values from 0.4 to 0.56 and (2) liquid aliphatic glycidyl ethers of neopentyl glycol, glycerine, hexanediol, and diglycerol having epoxy values from 0.6 to 0.7.

3. A composition as in claim 1 wherein said polyaminoamide (B)(1) is a solid having an amine number from about 30 to 60.

4. A composition as in claim 1 wherein said codiamine (B)(1)(c) is a member selected from the group consisting of 1,6-diamino-hexane, 1-amino-3-aminomethyl-3,5,5-trimethylcyclohexane, 1,2-diaminopropane, 1,6-diamino-2,2,4-(2,4,4)-trimethylhexane, 1,12-diamino-4,9-dioxadodecane, 3(4),8(9)-bis(aminotrimethyl)-tricyclo[5.2.1.0$^{2,6}$]decane, and piperazine.

5. A composition as in claim 1 wherein from 0.05 to 0.30 equivalent of amine hydrogen atoms of said polyaminoamide (B)(1) are preadducted with said glycidyl ether (B)(2).

6. A composition as in claim 1 wherein said glycidyl compound (B)(2) is a liquid aromatic glycidyl ether of bisphenol A or bisphenol F having an epoxy value from 0.40 to 0.56 and is present in said composition in an amount from 0.05 to 0.30 equivalent.

7. A composition as in claim 1 wherein said glycidyl compound (B)(2) is a liquid aliphatic glycidyl ether of neopentyl glycol, glycerine, hexanediol, or diglycerol having an epoxy value from 0.6 to 0.7 and is present in said composition in an amount from 0.05 to 0.25 equivalent.

8. A composition as in claim 1 wherein said polyamide (C) is a waxlike solid having a ring-and-ball softening point not over 150° C., codiamine (C)(3) is present in said polyamide and is 1,6-diaminohexane, 1,6-diamino-2,2,4(2,4,4)-trimethylhexane, 1,13-diamino-4,10-dioxatridecane, piperazine, N-aminoethylpiperazine, or 1,3-bis(4-piperidyl)propane, and said monocarboxylic acid (C)(4) is acetic acid, propionic acid, or butyric acid.

9. A method for coating a substrate or printing on said substrate which comprises applying a varnish or printing ink composition as in claim 1 to a surface of said substrate and evaporating the solvent or solvent mixture from said composition.

10. A substrate having a hardened coating or print thereon made by the method of claim 9.

* * * * *